July 16, 1968  D. W. ROPER  3,392,601

DRIVE MECHANISM

Filed March 25, 1966

INVENTOR
DANIEL W. ROPER

BY Hoffmann and Yount
ATTORNEYS

United States Patent Office 3,392,601
Patented July 16, 1968

3,392,601
DRIVE MECHANISM
Daniel W. Roper, Rochester, Mich., assignor to Eaton Yale & Towne Inc., Cleveland, Ohio, a corporation of Ohio
Filed Mar. 25, 1966, Ser. No. 537,481
17 Claims. (Cl. 74—711)

ABSTRACT OF THE DISCLOSURE

A drive mechanism includes a clutch means associated with driving and driven members and operable between an engaged position drivingly connecting the driving and driven members and a disengaged position permitting relative rotation between the members. Actuating means applies a force to the clutch to urge the clutch toward its engaged position against a force applied to the clutch urging the clutch to its disengaged position. The drive mechanism includes a temperature compensating means for controlling at least one of the forces to cause the clutch means to be engaged at substantially the same predetermined speed of relative rotation between the driving and driven members at all temperatures within a wide range.

---

The present invention relates to a drive mechanism and more particularly relates to a limited slip differential drive mechanism.

The principal object of the present invention is the provision of a new and improved drive mechanism wherein driving and driven members are drivingly connected at a predetermined slip speed therebetween and wherein the driving connection occurs at substantially the same predetermined slip speed at all temperatures in a wide temperature range.

A further object of the present invention is the provision of a new and improved drive mechanism having rotatable driving and driven members and clutch means therebetween movable between an engaged position drivingly connecting the members and a disengaged position permitting relative rotation or slip between the members and wherein the clutch means is urged toward its disengaged position by a disengaged force and urged toward its engaged position by an engaging force which varies with slip between the members, and including temperature compensating means for controlling one of the forces so that the engaging force overcomes the disengaging force to move the clutch means into driving relation between the members at a generally constant predetermined slip speed therebetween regardless of temperature.

Another object of the present invention is the provision of a new and improved drive mechanism operable to limit relative rotation between driving and driven members at a predetermined slip speed therebetween and wherein the members are drivingly connected by the action of a viscous coupling which is so constructed and arranged that effects of temperature variations on the viscosity of the coupling fluid are compensated for so that the driving and driven members are drivingly connected at substantially the same predetermined slip speed at all temperatures throughout the operating temperature range of the mechanism.

Another object of the present invention is the provision of a new and improved drive mechanism, as noted in the next preceding paragraph wherein the viscous coupling has viscous shear surfaces movable toward or away from each other in response to temperature changes with the relative movement of the shear surfaces being related to changes in viscosity of the viscous shear fluid effected by the changes in temperature.

Another object of the present invention is the provision of a new and improved slip limiting differential drive mechanism including a clutch movable into wedging driving engagement between members of the differential at a predetermined slip speed therebetween and a viscous shear coupling effecting movement of the clutch at the predetermined slip speed and wherein the coupling includes parts constructed from a material having a large coefficient of thermal expansion and operative upon a temperature change to change the distance between the shear surfaces of the coupling in accordance with temperature change so that the clutch is drivingly engaged with the members at substantially the same predetermined slip speed throughout the operative temperature range of the differential.

Other objects and advantages of the present invention will become apparent from a consideration of the detailed description thereof which follows and from the drawings which form a part of the specification and in which.

The present invention provides a new and improved drive mechanism having relatively rotatable members and clutch means for drivingly connecting the members in response to relative rotation therebetween. In particular, the present invention provides a new and improved limited slip differential having a clutch means movable to retard relative rotation of a side gear and carrier and which is moved at the same predetermined slip speed therebetween regardless of temperature.

Figure 1:
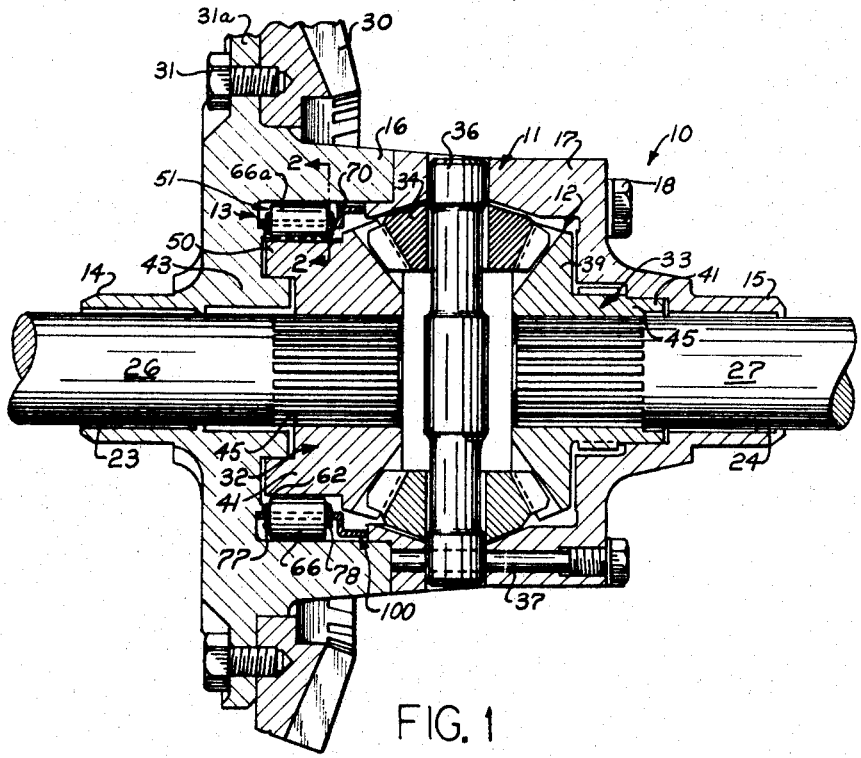
FIG. 1 is a sectional view of a limited slip differential embodying the present invention.

As representing the preferred embodiment of the present invention, a differential drive mechanism 10 is illustrated in FIG. 1 and is especially suitable for use in driving the wheels of a vehicle. The differential drive mechanism 10 comprises, in general, a rotatable planet gear carrier 11, a differential gear train 12, and a clutch mechanism 13 operable to retard rotation of one of the gears of the gear train 12 relative to the planet gear carrier 11.

The planet gear carrier 11 includes a pair of support portions 14 and 15 adapted to be received in bearings of a supporting structure, such as an axle housing, not shown, by which the carrier 11 is rotatably supported. The carrier 11 includes a pair of members 16 and 17 which are suitably secured together by means of suitable screws 18, and which define a chamber 19 in which the gear train 12 and the clutch means 13 are located. The support portions 14, 15 of the planet gear carrier 11 are formed on opposite portions of the members 16, 17, respectively, and are provided with openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means which are here represented by axle shafts 26, 27, respectively, whose outer ends are connected with traction wheels, or the like, not shown, and whose inner or adjacent ends are connected with the gear train 12, as will be described hereinbelow.

The differential mechanism 10 includes a conventional ring gear 30 extending around and mounted on the carrier 11 by means of connecting screws 31 which extend through a flange portion 32 of the member 16 which forms a part of the planet carrier 11. A suitable drive pinion, not shown, meshes with the ring gear 30 and represents the power input means for the differential mechanism 10 and upon rotation effects rotation of the ring gear 30, and rotation of the ring gear 30, of course, effects rotation of the planet carrier 11.

The gear train 12 is operable to transmit the rotary motion of the planet carrier 11 to the output shafts 26, 27. The gear train 12 comprises a pair of beveled type side gears 32, 33, and a group of beveled pinion planetary gears, in this case two such gears, 34, 35 disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured in the casing by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle values coming within the usual range of such values. The side gears 32, 33, while in the preferred embodiment, comprise bevel gears, may take other known forms and each of the gears 32, 33 comprises an annular body 39 having teeth formed thereon and a central hollow sleeve or hub 41 connected with the body and extending coaxially with the axis of rotation of the side gears. The carrier 11 is provided with hollow annular or axial sockets 43, 44 into which the hub portions 41 of the gears 32, 33, respectively, extend and which rotatably receive the gears. The gears 32, 33 are provided with splines 45 in the hub openings thereof which are engaged by corresponding splines formed on the inner ends of the axle shafts 26, 27, respectively, for drivingly connecting said shaft with the side gears.

The clutch means 13 is a double overrunning clutch operable to retard relative rotation of the side gear 32 with respect to the planet carrier 11. The clutch means 13 acts between the planet carrier and a shoulder 50 on the hub 41 of the side gear 32. The outer surface of the shoulder 50 includes a plurality of substantially flat surface areas 60 extending therearound and at diametrically opposite portions thereof has grooves 61 and 62 formed therein. The grooves 61 and 62 are V-shaped grooves of only a slight depth.

The clutch means 13 includes a roller cage mechanism 51 which comprises a shiftable roller cage 65 and a plurality of rollers 66 supported by the shiftable roller cage 65 and corresponding in number to the number of flat surface areas on the shoulder 50 plus the number of grooves 61, 62. The rollers 66 are located in openings in the roller cage and upon shifting movement of the roller cage, the rollers, of course, move with the roller cage. The rollers 66 engage the surface areas 60 of the shoulder 50 and two rollers, namely, 66a and 66b, are located in the V-grooves 61, 62, respectively.

The roller cage 65 is shiftable or movable, as noted above, from a position shown in FIG. 2 wherein the rollers 66 permit free wheeling of the side gear and planet carrier 11 to a position wherein the rollers 66 wedgingly engage surface areas 60 of the shoulder 50 and the arcuate surface 70 of the differential housing member 16 and when the rollers are wedgingly engaged with these surfaces, the planet carrier 11 is drivingly connected to the shoulder 50 of the side gear 32, and in this position relative movement of the side gear 32 and the carrier 11 is prevented.

Figure 2:
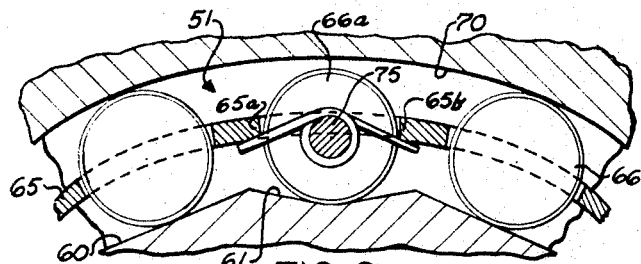
FIG. 2 is a fragmentary sectional view taken approximately along line 2—2 of FIG. 1.

A suitable means is provided for yieldably holding the roller cage 51 in a centered or neutral position, and in the preferred and illustrated embodiments, a biasing means is provided for biasing the rollers 66 and the roller cage 65 into a centered or neutral position wherein the rollers 66 are not drivingly connecting the carrier 11 and the side gear 32. The biasing means may take different forms, but as shown in FIG. 2, includes a spring detent roller arrangement which includes the rollers 66a and 66b. The rollers 66a, 66b include stem portions 75. The stem portions 75 extend axially outwardly of the rollers 66a and 66b, respectively, as best shown with respect to rollers 66a in FIG. 2. Encircling the opposite stem portions 75 are spring members 77, 78, respectively. The spring members encircle the opposite stem portions of the roller 66a and opposite ends of the springs engage portions 65a, 65b of the roller cage intermediate the openings in the roller cage in which the roller 66a is located.

From the above description, it should be apparent that as the roller 66a tends to move out of the V-groove 61, the roller 66a tends to rise and the ends of the springs 78, 77 will resist movement of the roller upwardly and tend to hold the roller in the bottom of the V-groove. Of course, once the force applied by the springs 77, 78 is overcome, the roller 66a will move upwardly out of the bottom of the V-groove and permit shifting of the roller cage 65 so that the rollers 66 carried thereby move into driving engagement with the surfaces 60 and 70 on the members 50 and 16, respectively. The rollers 66a and 66b do not transmit driving torque between the planet carrier 11 and the shoulder 50 of the gear 32.

From the above description, it should be apparent that the roller mechanism is biased into a centered position wherein it does not drivingly engage the shoulder 50 and the differential gear casing 11. However, it may be moved into driving engagement against the bias of this spring, as described hereinabove. The means for moving the roller cage so that the rollers drivingly engage the surfaces 70 and 60 comprises a viscous coupling mechanism, generally designated 100. The viscous coupling mechanism 100 includes a portion 101 of the roller cage which extends axially of the side gear 32 and away from the rollers 66. The portion 101 of the roller cage extends away from the rollers 66 and adjacent an inner wall of the planet carrier 11 to form a shear space 103 therebetween, bounded by shear surfaces 104, 105 formed on the portion 101 and the carrier 11, respectively A viscous shear fluid is located in the shear chamber 103 and functions as a drive connection between the planet carrier 11 and the portion 101 of the roller cage. Upon a predetermined amount of relative rotation of the planet carrier 11 and the side gear 32, the drive force applied by the shear fluid of the viscous coupling 100 overcomes the bias of the springs 77, 78 and effects shifting movement of the roller cage 51 due to the operation of the viscous coupling 100. This effects movement of the roller cage 51 and the rollers 66 carried thereby into driving engagement with the surfaces 70 and 60.

If the planet carrier 11 rotates relative to the side gear 32 as when the traction wheel connected with the output shaft 27 slips, the viscous coupling mechanism 100 operates to tend to drag the roller cage 51 in the direction of rotation of the planet carrier 11 and if the relative rotation is sufficient to overcome the biasing springs, the planet carrier 11 and side gear 32 will be locked together by the rollers 66. If the side gear 32 rotates relative to the carrier 11 as when the traction wheel which is connected to the output shaft 26 slips, the viscous coupling tends to maintain the roller cage 51 rotating at a speed which is a function of the speed of the carrier 11 and thus at a speed lower than that of the side gear 32. As a result, the side gear rotates relative to the roller cage 51 and effects a drive connection between the planet carrier 11 and side gear 32 through the rollers 66. This drive connection again is effected only if the relative rotation between the planet carrier 11 and side gear is sufficient to provide a force overcoming the bias of the springs 77, 78.

As temperatures vary, the viscosity of the shear fluid in the shear space 103 also varies. As a result, the force applied by the shear fluid to the cage 65 to effect movement of the rollers and the driving engagement between the planet carrier 11 and side gear 32 tends to vary. Thus, at low temperatures when the viscosity of the shear fluid is high, a slight relative rotation between the planet carrier and side gear may cause movement of the rollers into driving engagement, and the limited slip differential 10, at times, is locked up when unnecessary. Moreover, the constant driving engagement of the rollers with the planet carrier and side gear causes unnecessary wear affecting the life of the differential. Moreover, at high temperatures, when the viscosity of the shear fluid is less, the limited slip differential may not lock up when it should.

In order to solve these problems, the differential 10 is constructed so that the driving and driven members are drivingly connected at a predetermined slip speed therebetween with the driving connection occurring at substantially the same predetermined slip speed at all temperatures over a wide temperature range. As noted above, the differential 10 includes the viscous coupling 100 urging the rollers 66 into driving engagement between the carrier 11 and the side gear 32, while the springs 77, 78 urge the rollers 66 to a disengaged or neutral position. The differential 10, as noted, is constructed to cause the driving connection between the planet carrier 11 and side gear 32 to occur at substantially the same predetermined slip speed regardless of temperature, and specifically includes a temperature compensating means for controlling one of the forces acting on the rollers 66 so that the force applied to the rollers by the viscous coupling 100 overcomes the force applied to the rollers by the springs 77, 78 at substantially the same predetermined slip speed at all temperatures within a wide temperature range.

Figure 3:
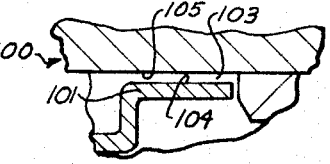
FIG. 3 is a fragmentary view on an enlarged scale of a portion of FIG. 1.

In accordance with the embodiment shown in FIG. 3, the temperature compensating means include sthe portion 101 of the viscous coupling 100. The portion 101 is constructed from material having a higher coefficient of thermal expansion than the material forming the planet carrier 11. The portion 101 expands and contracts in response to increases and decreases in temperature to move the shear surfaces 104, 105 relatively toward and away from each other in response to such temperature changes. In the illustrated and preferred embodiment, the portion 101 is composed of a material which preferably has a relatively high coefficient of thermal expansion as compared to the material of the planet carrier 11. Lexan, Delrin, aluminum, brass and copper are materials which have been found to be well suited for use as the material of the portion 101.

The force applied by the viscous shear fluid coupling 100 to the cage 65 is proportional to both the viscosity of the shear fluid and the distance between the shear surfaces 104, 105. In the coupling 100, as temperature increases, and the viscosity of the shear fluid decreases, the clearance between the shear surfaces 104 and 105 decreases as a result of the expansion of the portion 101 as previously described. Conversely, when the temperature decreases, the viscosity of the shear fluid increases and the clearance between the surfaces 104, 105 increases as the extending portion 101 contracts. It should be apparent then that the force transmitted by the temperature compensated fluid coupling to the clutch means is substantially independent of temperature changes, so that the rollers 66 are drivingly engaged with the surfaces 60 and 70 against the bias of the springs 77, 78 at a substantially constant speed of relative rotation therebetween throughout the operating temperature range of the differential.

Figure 4:
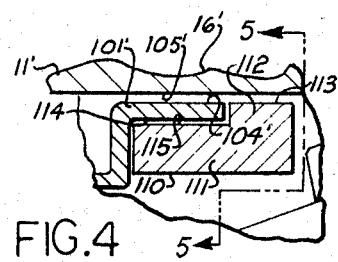
FIG. 4 is a fragmentary view of a modification of the differential shown in FIG. 1.
Figure 5:
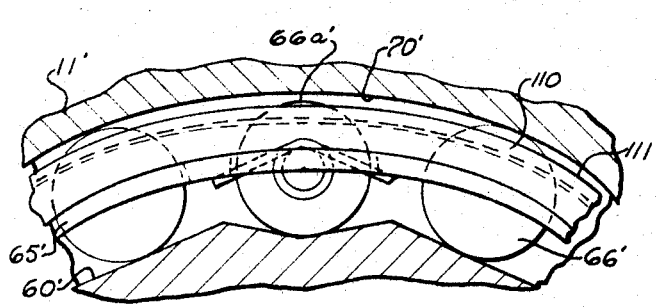
FIG. 5 is a fragmentary sectional view taken approximately along line 5—5 of FIG. 4 and with certain parts removed.

A modification of the present invention is shown in FIGS. 4 and 5, and parts thereof which correspond with parts previously described are denoted by corresponding primed reference characters. As shown in FIGS. 4 and 5, the cage 65' includes a projection portion 101' having a circumferential shear surface 104' thereon spaced from a shear surface 105' formed on the member 16'.

The projection 101' is associated with temperature compensating means in the form of an annular ring 110 having a generally L-shaped cross section with one leg 111 of the L extending coaxially with the projection 101' and along its inner periphery. The other leg 112 of the L extends radially outwardly and includes a surface 113 forming an outer periphery of the ring 110 and which is adjacent the shear surface 105'. The material of the cage 65' is preferably steel, or similar rigid sheetlike material, while the material of the ring 110 is preferably a material having a relatively high coefficient of thermal expansion when compared to the material of the cage 65' and the planet carrier 11. This material is preferably one such as Lexan, Delrin, aluminum, copper or brass. Due to the differences in coefficients of expansion of the material of the ring 110 and cage 65', the ring 110 will expand at a greater rate than the cage 65' as temperature increases, ultimately resulting in tight frictional engagement between a surface 114 on the inner periphery of the projection 101' and a surface 115 on the outer periphery of the leg 111 of the ring 110. When the surfaces 114, 115 are thus engaged, the ring 110 is held against movement relative to the cage 65'. It will be apparent that when the ring 110 expands, the surface 113 thereof provides an additional viscous shear surface area. The additional shear surface area provided by expansion of the ring 110 relative to the cage 65' compensates for the decrease in viscosity of the shear fluid due to increasing temperatures. This temperature compensation imparts a force to the clutch which overcomes the disengaging force applied thereto by the springs 77', 78' at a generally constant predetermined slip speed between the members to provide for engagement of the rollers 66' between the surfaces 60', 70' of the clutch means 13' at the predetermined speed throughout the operating temperature range of the coupling.

As temperatures decrease, the ring 110 contracts at a greater rate than does the cage 65' and planet carrier 11' thus moving the surface 113 radially inwardly from the surface 105'. This inward movement of the surface 113 reduces the effective shear surface area of the coupling as temperature decreases to compensate for increased viscosity of the shear fluid in reverse of the manner described above.

Although the present invention has been described in considerable detail, it should be understood that certain modifications and adaptations could be made without departing from the spirit of the present invention. It is my intention to cover hereby all such modifications, adaptations and uses coming within the scope of the appended claims.

Having described my invention, I claim:

1. A drive mechanism comprising driving and driven members, clutch means operatively associated with said driving and driven members and operable between an engaged position wherein said driving and driven members are drivingly connected thereby and a disengaged position permitting relative rotation between said members, means for applying a first force to said clutch means urging said clutch means toward its disengaged position, actuating means applying a second force to said clutch means for urging said clutch means toward its engaged position, and temperature compensating means for controlling at least one of said forces to cause said second force to overcome said first force at substantially the same predetermined speed of relative rotation between said driving and driven members at all temperatures within a wide range.

2. A drive mechanism as defined in claim 1 wherein said temperature compensating means forms a part of said actuating means and is operable to control said second force.

3. A drive mechanism comprising driving and driven members, clutch means operatively associated with said driving and driven members and operable between an engaged position wherein said driving and driven members are drivingly connected thereby and a disengaged position permitting relative rotation between said members, means for applying a first force to said clutch means urging said clutch means toward its disengaged position, actuating means applying a second force to said clutch means for urging said clutch means toward its engaged position, and temperature compensating means for controlling at least one of said forces to cause said second force to overcome said first force at substantially the same predetermined speed of relative rotation between said driving and driven members at all temperatures within a wide range, said temperature compensating means forming a part of said actuating means and operable to control said second force, said actuating means comprising a viscous shear coupling with said second force varying with the amount of relative rotation between said members and the viscosity of the viscous shear fluid, and said temperature compensating means being operable to maintain said second force substantially the same at said predetermined speed of relative rotation even though viscosity of the fluid changes.

4. A drive mechanism comprising first and second rotatable members, clutch means operatively associated with said first and second members to drivingly connect said first and second members and operable between an engaged position wherein said first and second members are drivingly connected and a disengaged position permitting relative rotation between said members, and actuating means operatively associated with said first and second members and said clutch means and responsive to a predetermined differential in speed between said first and second members to move said clutch to its said engaged position, said actuating means including spaced opposed relatively rotatable viscous shear surfaces, one of said shear surfaces movable toward and away from the other shear surface in response to temperature changes with movement of said one surface varying the dimensions of the space therebetween to compensate for changes in viscosity of a viscous shear fluid in said shear space and providing for movement of said clutch means to said engaged position substantially at said predetermined speed at all temperatures within a wide temperature range.

5. A drive mechanism as defined in claim 4 wherein one of said shear surfaces is formed on a member composed of a material having a high coefficient of thermal expansion as compared with the material forming another of said shear surfaces.

6. A drive mechanism as defined in claim 5 wherein one of said shear surfaces is associated with said clutch means for effecting movement thereof to said engaged position and the other of said surfaces is formed on a portion of one of said members.

7. A drive mechanism as defined in claim 5 wherein said member having a high coefficient of thermal expansion comprises a material selected from the group consisting of Lexan, Delrin, aluminum, copper or brass.

8. A drive mechanism as defined in claim 5 wherein said clutch means includes a torque transmitting means movable into wedging engagement between said first and second members and a support member supporting said torque transmitting means and movable with said first member, said support member including a projecting portion extending therefrom and having a surface adjacent said second member, said surface forming at least a part of one of said viscous shear surfaces and said support member being operable to move said force transmitting means into wedging engagement with said first and second members at said predetermined speed.

9. A drive mechanism as defined in claim 8 and further including an annular member associated with said projecting portion, said annular member movable into driving engagement with said projecting portion in response to temperature changes and including a surface forming a part of one of said viscous shear surfaces.

10. The drive mechanism of claim 9 wherein said annular member is composed of said material having a high coefficient of thermal expansion and wherein the material comprising said support member has a coefficient of thermal expansion substantially less than the material forming said annular member.

11. The drive mechanism of claim 10 wherein movement of said annular member into engagement with said projecting portion is effective to increase the area of one of said shear surfaces.

12. The drive mechanism as defined in claim 5 wherein said clutch means includes a plurality of roller members spaced about one of said members, a cage member for retaining said roller members in spaced relation about said one of said members, and projecting means extending from said cage member to adjacent the other of said members and including at least a part of one of said viscous shear surfaces, said projecting means being in part formed of said material having a high coefficient of thermal expansion whereby said part expands and contracts relative to the other of said members upon temperature increases and decreases changing said shear space to compensate for changes in viscosity of said shear fluid.

13. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation of said side gears and a rotatable planet carrier drivingly connected with said input means and at least one planetary gear rotatably mounted on said planet carrier and meshing with said side gears to drive the same, clutch means located between spaced drive surfaces on said input means and one of said output means, respectively, said clutch means being movable between an engaged position wherein said input and output means are drivingly connected thereby and a disengaged position permitting relative rotation between said input and output means, and means operative to move said clutch means from its said disengaged position to its engaged position, said means including first and second spaced opposed viscous shear surfaces forming a viscous shear space therebetween, said surfaces being movable toward and away from each other in response to temperature changes, said movement of said shear surfaces corresponding to changes in viscosity of a viscous shear fluid in said shear space and effective to engage said clutch means at a substantially uniform predetermined slip speed between the input and output means at all temperatures throughout a wide temperature range.

14. The drive mechanism as defined in claim 13 wherein said clutch means includes a plurality of drive members movable into wedging engagement between said drive surfaces, a cage member associated with said drive members for moving said drive members to said engaged position at said predetermined slip speed, and a part associated with said cage member and extending adjacent one of said planet carriers and forming at least a portion of one of said viscous shear surfaces, said part composed of a material having a high coefficient of thermal expansion relative to the coefficient of thermal expansion to said member.

15. The drive mechanism as defined in claim 14 wherein said part comprises a flange of said cage member.

16. The drive mechanism as defined in claim 13 wherein said clutch means includes a plurality of drive members movable into wedging engagement between said planet carrier and one of said rotatable output means, a cage member operable to move said drive members at said predetermined speed, said cage member including a projecting portion extending adjacent a surface on said planet carrier, and an annular member adjacent said projecting portion having a surface thereon forming at least a part of one of said shear surfaces, said annular member composed of a material having a high coefficient of thermal expansion and movable into and out of driving engagement with said projecting portion in response to temperature changes.

17. A drive mechanism as defined in claim 1 wherein said actuating means comprises a viscous shear coupling with said second force varying with the amount of relative rotation between said members and with the viscosity of the viscous shear fluid, and said temperature compensating means being operable to effect engagement of said clutch means at said predetermined speed of relative rotation even though viscosity of the fluid changes.

References Cited

UNITED STATES PATENTS

| | | | |
|---|---|---|---|
| 2,050,344 | 8/1936 | Lapham | 74—711 X |
| 2,292,988 | 8/1942 | Bloomfield et al. | 192—45 |
| 2,883,884 | 4/1959 | Norton | 74—711 |
| 3,175,661 | 3/1965 | Maurer et al. | 192—45.1 |
| 3,211,022 | 10/1965 | Anderson | 74—711 |
| 3,261,230 | 7/1966 | Rudnicki | 74—710.5 |

FRED C. MATTERN, JR., *Primary Examiner.*

ARTHUR T. McKEON, *Examiner.*